N. K. BOWMAN.
FEEDER WIRE SPLICE.
APPLICATION FILED AUG. 9, 1917. RENEWED FEB. 18, 1920.
1,351,366.
Patented Aug. 31, 1920.
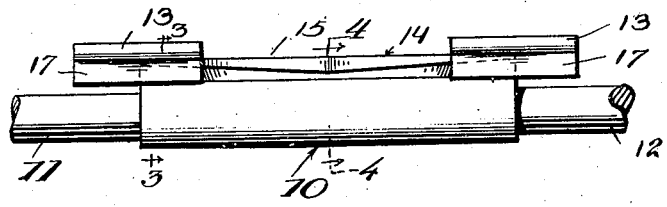
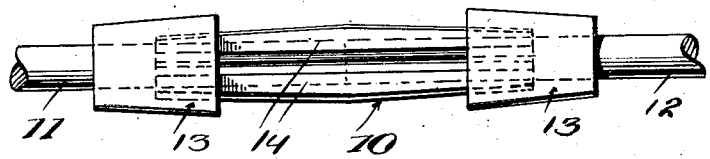
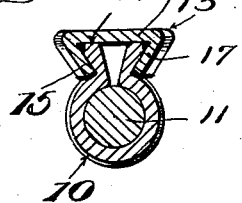
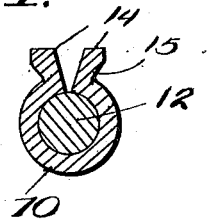
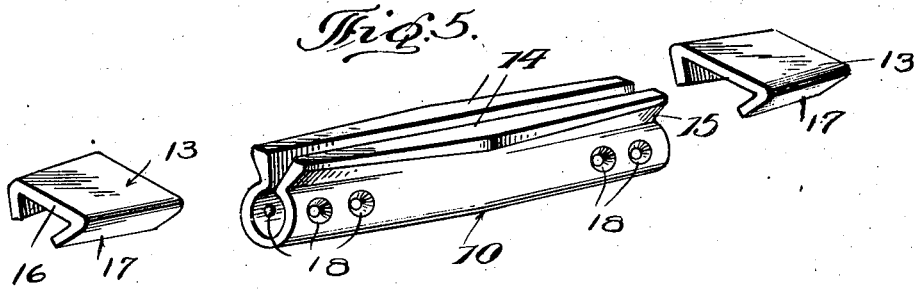
Inventor
N. K. Bowman
By
Attorneys.

UNITED STATES PATENT OFFICE.

NEWTON K. BOWMAN, OF NORTH LAWRENCE, OHIO, ASSIGNOR TO THE AMERICAN MINE DOOR COMPANY, A CORPORATION OF OHIO.

FEEDER-WIRE SPLICE.

1,351,366.  Specification of Letters Patent.  Patented Aug. 31, 1920.

Application filed August 9, 1917, Serial No. 185,386. Renewed February 18, 1920. Serial No. 359,543.

*To all whom it may concern:*

Be it known that I, NEWTON K. BOWMAN, a citizen of the United States, residing at North Lawrence, in the county of Stark and State of Ohio, have invented certain new and useful Improvements in Feeder-Wire Splices, of which the following is a specification.

My invention relates to new and useful improvements in splicing devices and has for its primary object the provision of an improved form of feeder wire splice which may be readily applied to the ends of a feeder wire to be spliced without the employment of any tool other than a hammer or equivalent device.

A still further object of my invention is to provide a splice of this character embodying a splice sleeve having clamping flanges or jaws and clamping members adapted to be driven over the jaws to tighten the sleeve about the wire sections.

In this connection another object which I have in view is to provide a splice of this character in which practically the entire surface of the wire sections inclosed within the sleeve are in engagement with the sleeve to form a perfect electrical contact all around the wire, the sleeve gripping the wire tightly throughout practically its entire circumference so that the splice is kept from being pulled apart and the joint is guarded against corrosion.

With these and other objects in view, the invention consists in certain constructions and arrangements of the parts that I shall hereinafter fully describe and claim.

In the drawings:

Figure 1 is a side elevation of my improved feeder splice connecting the adjacent ends of wire sections;

Fig. 2 is a plan view;

Fig. 3 is a vertical sectional view taken on the line 3—3 of Fig. 1, looking in the direction of the arrows;

Fig. 4 is a corresponding section taken on the line 4—4 of Fig. 1, looking in the direction of the arrows;

Fig. 5 is an unassembled perspective view of the splice sleeve and clamps, the sleeve shown being of somewhat modified construction.

Broadly speaking my invention comprehends a splice sleeve 10 adapted to receive the adjacent ends of wire sections 11 and 12 to be spliced and to be clamped about the wire sections by clamping members 13.

More specifically, the sleeve, which is formed of any suitable metal, such as bronze, is, in fact, a compression sleeve, being open along one side and being provided throughout its length with a bore of uniform diameter which in released position of the sleeve is slightly greater than the diameter of the wire sections to be spliced. This sleeve tapers somewhat from its center toward each end to give it as much lightness as possible consistent with the necessary strength at its center where the ends of the wires meet. This sleeve at either side of its opening is provided with oppositely formed clamping flanges or jaws 14. These jaws taper in width or thickness from their center to their ends and are undercut to provide clamping shoulders 15 which gradually decrease in depth from the ends of the jaws to their centers.

Each clamping member 13 is formed of suitable metal such as steel and includes a flat body portion 16 tapering in width from one end to the other and provided with downwardly and inwardly directed clamping flanges 17 for engagement against the outer sides of the jaws and beneath the undercut shoulders thereof. The tapering of the body from end to end corresponds to the tapering of the outer faces of the jaws of the sleeve and the inclination of the flanges 17 corresponds to the inclination of the undercut shoulders 15. The clamping members are so formed with respect to the jaws of the compression sleeve or splice sleeve that when the ends of the wire sections 11 and 12 are inserted in the ends of the sleeve to engage each other centrally of the sleeve, the wider ends of the clamping members may just be slipped over the free ends of the jaws of the sleeve. Obviously, when the clamping members are driven inwardly toward each other or toward the center of the sleeve they will draw the jaws of the splice sleeve toward each other to compress or clamp the sleeve tightly about the ends of the wires. By proper care in proportioning of the parts the sleeve may be so formed that it will practically meet about the wire sections when it is firmly clamped to them so as to provide a practically continuous electrical contact between the sleeve and wire sections and one which will firmly anchor the wire sections and at the same time protect the inclosed portions of the wires from corrosion. Unless exceptional strain is placed upon the feeder wire the splices above described are fully strong enough to prevent separation of any of the wire sections. If desired, however, the splice sleeve in its sides and adjacent both ends may be formed with one or more outwardly flaring openings 18 into which solder may be dropped after the joint has been formed to additionally secure the wire sections in the sleeve.

Obviously, the wire sections may be disconnected at any time by driving off the clamping members, and in case drop solder has been employed, by then driving the sleeve along the wire sections to shear off the solder.

Although this sleeve is particularly adapted for splicing feeder wires, it will be apparent that it may, of course, be employed for splicing wires of various characters, pump rods and the like, and I therefore reserve the right to make any changes which may fall within the scope of the appended claims and which may be desired to adapt it for various uses. In other words, changes in proportion, in cross sectional shape, and in the material of which it is formed, may be freely made.

Having thus described the invention, what is claimed as new is:

1. A splicing device including a sleeve open along one side and provided along the sides of the opening with clamping jaws tapering in thickness toward their outer ends and undercut to provide locking shoulders tapering in width toward the centers of the jaws, and clamping members each tapering in width from one end to the other and provided at their side edges with downwardly and inwardly inclined clamping flanges for engagement against the outer faces of the clamping jaws and under faces of the shoulders of the jaws.

2. A clamping device including a metallic compression sleeve open along one side and provided at either side of such opening with clamping jaws tapering in thickness longitudinally and provided with locking shoulders tapering in depth longitudinally of the jaws, and a clamp adapted to be driven over corresponding ends of the jaws to engage said shoulders to draw the sleeves together as the clamp is advanced upon the shoulders and coact with the shoulders for locking the sleeve against accidental displacement.

In testimony whereof I affix my signature.

NEWTON K. BOWMAN. [L. S.]